US012731395B2

(12) United States Patent
Morinaga et al.

(10) Patent No.: US 12,731,395 B2

(45) Date of Patent: Sep. 8, 2026

(54) PROCESSING METHOD, AND PROCESSING SYSTEM

(71) Applicant: NTT, Inc.

(72) Inventors: Ichiro Morinaga, Tokyo (JP); Takeharu Eda, Tokyo (JP); Akira Sakamoto, Tokyo (JP); Kyoku Shi, Tokyo (JP); Shohei Enomoto, Tokyo (JP)

(73) Assignee: NTT, Inc., Tokyo (JP)

(*) Notice: Subject to any disclaimer, the term of this patent is extended or adjusted under 35 U.S.C. 154(b) by 286 days.

(21) Appl. No.: 18/578,631

(22) PCT Filed: Jul. 14, 2021

(86) PCT No.: PCT/JP2021/026512

§ 371 (c)(1),
(2) Date: Jan. 11, 2024

(87) PCT Pub. No.: WO2023/286218

PCT Pub. Date: Jan. 19, 2023

(65) Prior Publication Data

US 2024/0338939 A1 Oct. 10, 2024

(51) Int. Cl.

*G06V 10/94* (2022.01)
*G06N 3/08* (2023.01)
*G06V 10/40* (2022.01)
*G06V 10/764* (2022.01)
*G06V 10/77* (2022.01)

(Continued)

(52) U.S. Cl.

CPC .............. *G06V 10/95* (2022.01); *G06V 10/40* (2022.01); *G06V 10/764* (2022.01); *G06V 10/82* (2022.01); *G06N 3/08* (2013.01); *G06V 10/7715* (2022.01); *H04L 67/12* (2013.01)

(58) Field of Classification Search

CPC ...... G06V 10/95; G06V 10/40; G06V 10/764; G06V 10/82; G06V 10/7715; G06N 3/08; G06N 5/04; G06N 20/00; H04L 67/12; G16Y 40/10; G16Y 40/20

See application file for complete search history.

(56) References Cited

U.S. PATENT DOCUMENTS

2020/0082259 A1* 3/2020 Gu ......................... G06N 3/045

OTHER PUBLICATIONS

Laskaridis, Stefanos, et al. "SPINN: Synergistic progressive inference of neural networks over device and cloud." Proceedings of the 26th annual international conference on mobile computing and networking. 2020. (Year: 2020).*

(Continued)

*Primary Examiner* — Ross Varndell

(57) ABSTRACT

A processing system (100) is a processing method for performing inference processing in an edge device (20) and a server device (30), the method including a first transmission process in which the edge device (20) transmits first data based on data to be inferred to a server device that performs first inference, and a second transmission process in which the edge device (20) transmits second data based on the data to be inferred to an execution unit that performs second inference in response to a request from the server device (30), in which the request from the server device (30) is made in a case where a result of the first inference performed in the server device (30) is equal to or less than predetermined confidence.

11 Claims, 18 Drawing Sheets

(51) Int. Cl.
*G06V 10/82* (2022.01)
*H04L 67/12* (2022.01)

(56) References Cited

OTHER PUBLICATIONS

Zamirai, Babak, et al. "Sieve: Speculative inference on the edge with versatile exportation." 2020 57th ACM/IEEE Design Automation Conference (DAC). IEEE, 2020. (Year: 2020).*
Shao, Jiawei, Yuyi Mao, and Jun Zhang. "Learning task-oriented communication for edge inference: An information bottleneck approach." IEEE Journal on Selected Areas in Communications 40.1 (2021): 197-211. (Year: 2021).*
Takeharu, Eda, et al. "An Efficient Event-driven Inference Approach to Support AI Applications in IOWN Era." NTT Technical Review 19.2 (2021): 41-46. (Year: 2021).*
Enomoto et al. (2020) "Acceleration of Deep Learning Inference by Model Cascading" IEICE Technical Report, vol. 119, No. 481.

* cited by examiner

30
SERVER DEVICE
ORIGINAL DATA : 11100110
(1) 3-bit QUANTIZATION
111
(2) TRANSMISSION (111)
111
(3) QUANTIZATION RELEASE
11100000
(4) INFERENCE
DNN−1
(5) 6-bit QUANTIZATION
111 001
(6) SUBTRACTION OF COMMON PORTION
(7) TRANSMISSION (001)
001
(8) INTEGRATION
111001
(9) QUANTIZATION RELEASE
11100100
(10) INFERENCE
DNN−2

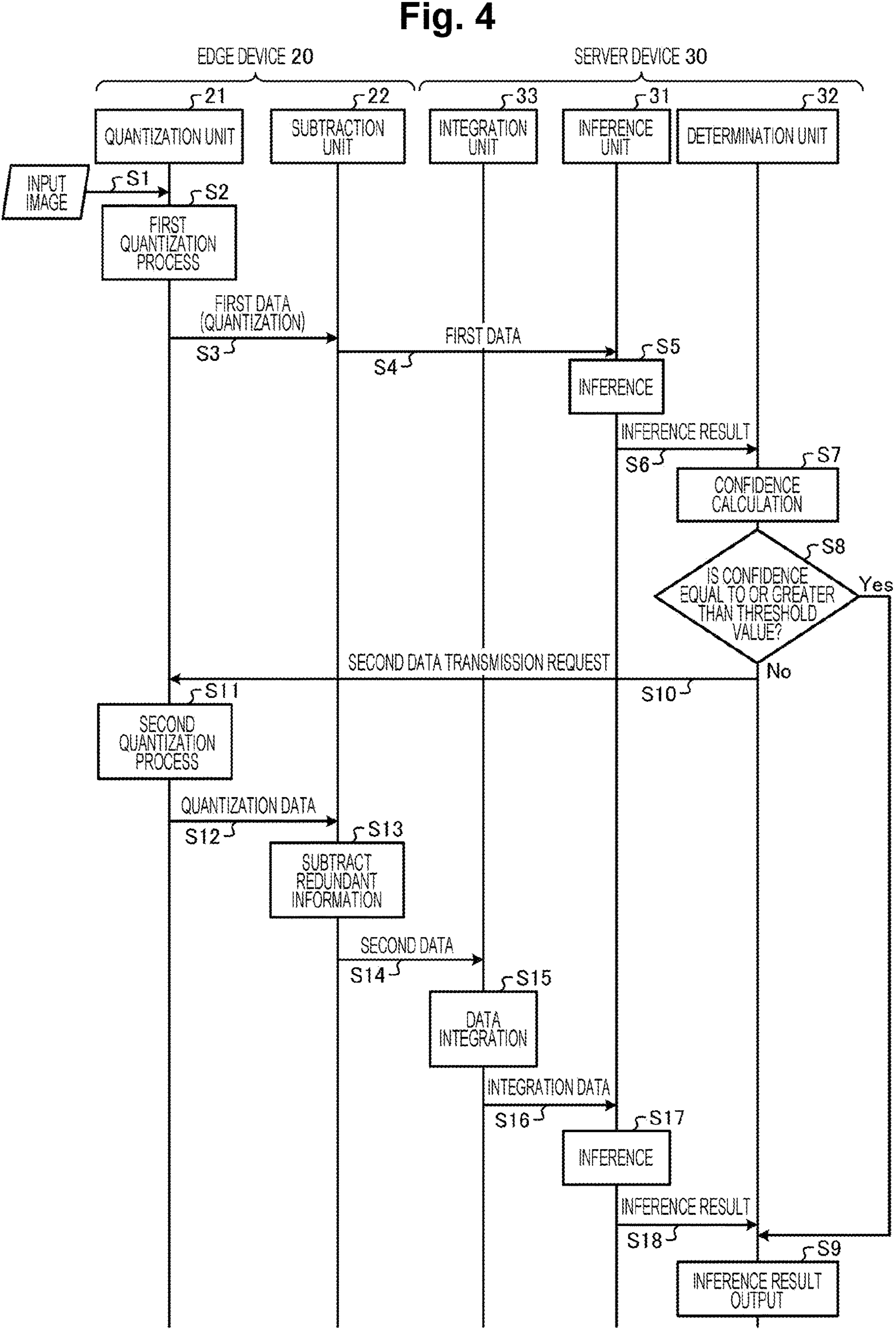
Fig. 4
EDGE DEVICE 20
SERVER DEVICE 30
21
QUANTIZATION UNIT
22
SUBTRACTION UNIT
33
INTEGRATION UNIT
31
INFERENCE UNIT
32
DETERMINATION UNIT
INPUT IMAGE
S1
S2
FIRST QUANTIZATION PROCESS
FIRST DATA (QUANTIZATION)
S3
FIRST DATA
S4
S5
INFERENCE
INFERENCE RESULT
S6
S7
CONFIDENCE CALCULATION
S8
IS CONFIDENCE EQUAL TO OR GREATER THAN THRESHOLD VALUE?
Yes
No
SECOND DATA TRANSMISSION REQUEST
S10
S11
SECOND QUANTIZATION PROCESS
QUANTIZATION DATA
S12
S13
SUBTRACT REDUNDANT INFORMATION
SECOND DATA
S14
S15
DATA INTEGRATION
INTEGRATION DATA
S16
S17
INFERENCE
INFERENCE RESULT
S18
S9
INFERENCE RESULT OUTPUT

Fig. 5

| NUMBER OF QUANTIZATION BITS | 8bit | 7bit | 6bit | 5bit | 4bit | 3bit |
| --- | --- | --- | --- | --- | --- | --- |
| PRECISION | 70.96% | 70.98% | 70.74% | 69.49% | 65.41% | 55.20% |
| NUMBER OF TRANSMISSION BITS | 80000 | 70000 | 60000 | 50000 | 40000 | 30000 |

Fig. 6

| NUMBER OF FIRST QUANTIZATION BITS | 3 | 4 | 5 |
| --- | --- | --- | --- |
| NUMBER OF SECOND QUANTIZATION BITS | 4 | 5 | 6 |
| PRECISION | 63.97% | 69.25% | 70.72% |
| NUMBER OF TRANSMISSION BITS | 35303 | 45046 | 54900 |

Fig. 7

| NUMBER OF FIRST QUANTIZATION BITS | 4 | 4 | 4 |
| --- | --- | --- | --- |
| NUMBER OF SECOND QUANTIZATION BITS | 6 | 6 | 6 |
| PRECISION | 70.62% | 70.28% | 69.51% |
| NUMBER OF TRANSMISSION BITS | 52385 | 50000 | 46992 |

Fig. 8

| NUMBER OF FIRST QUANTIZATION BITS | 3 | 3 | 3 |
|---|---|---|---|
| NUMBER OF SECOND QUANTIZATION BITS | 5 | 5 | 5 |
| PRECISION | 69.11% | 66.85% | 65.56% |
| NUMBER OF TRANSMISSION BITS | 43810 | 40000 | 38314 |

Figure 10:
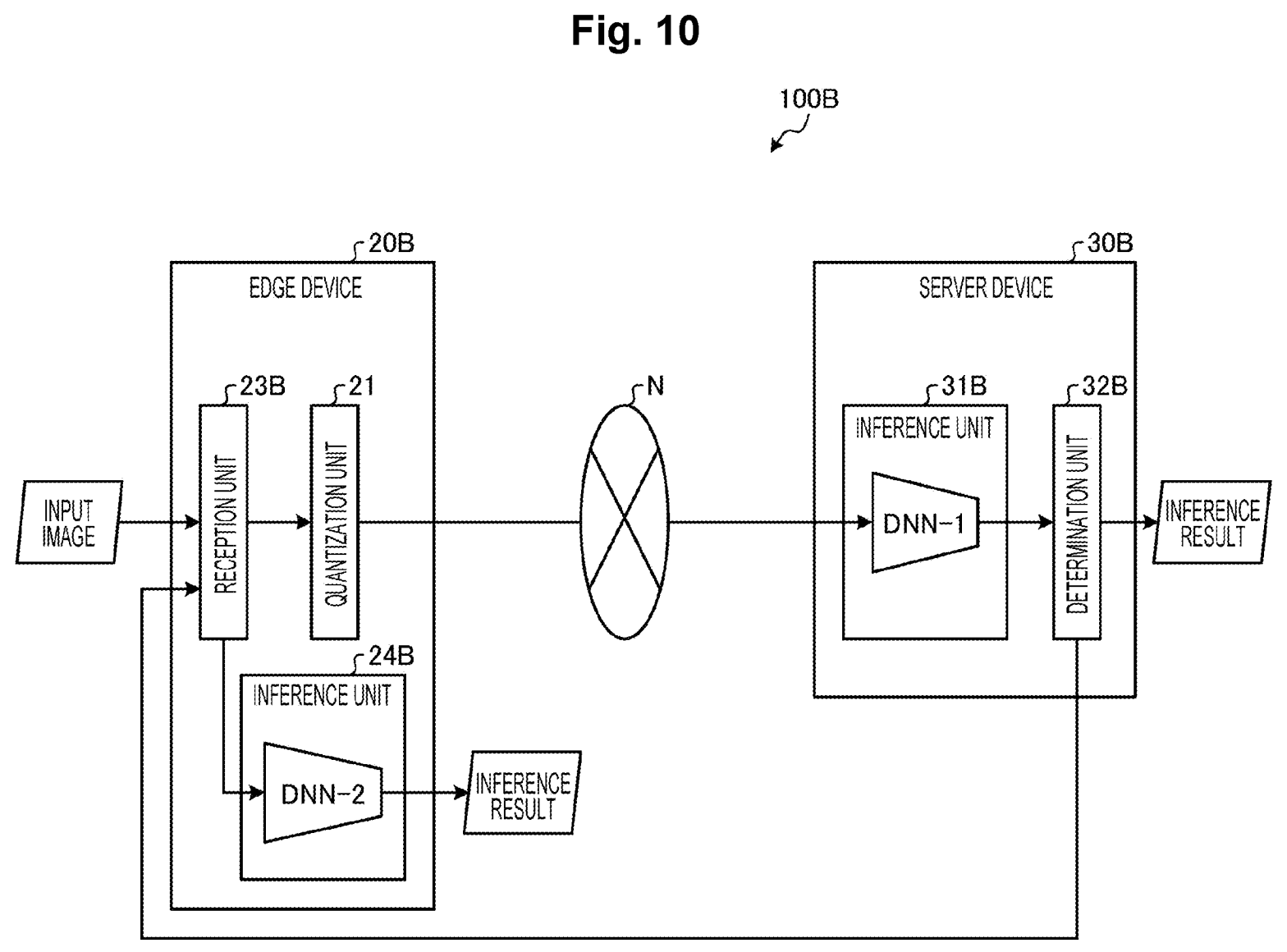

INPUT IMAGE

EDGE DEVICE 20B

RECEPTION UNIT 23B

QUANTIZATION UNIT 21

INFERENCE UNIT 24B

DNN-2

INFERENCE RESULT

N

SERVER DEVICE 30B

INFERENCE UNIT 31B

DNN-1

DETERMINATION UNIT 32B

INFERENCE RESULT

Figure 12:
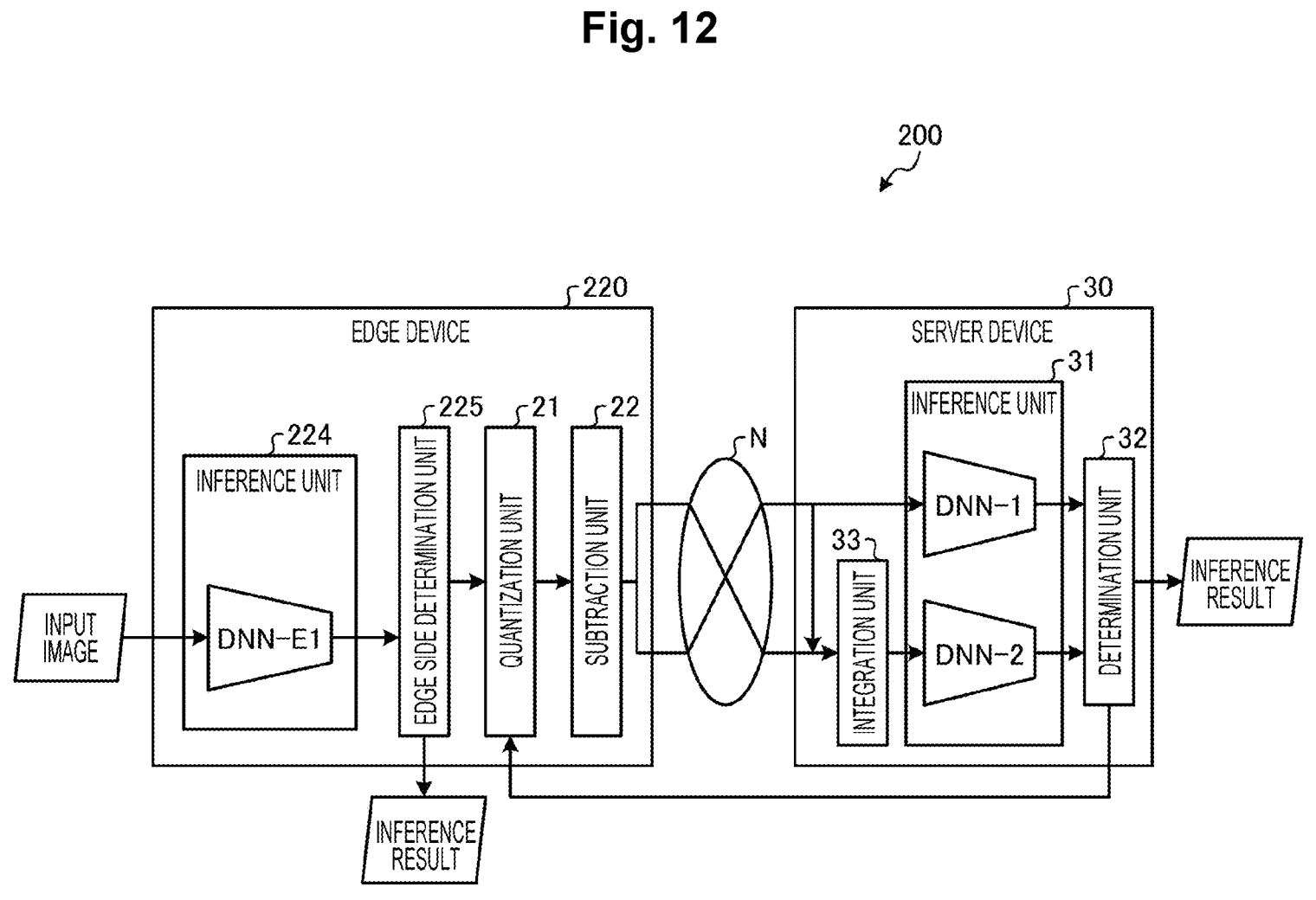

30 SERVER DEVICE

31 INFERENCE UNIT

DNN-1

DNN-2

32 DETERMINATION UNIT

33 INTEGRATION UNIT

INFERENCE RESULT

N

220 EDGE DEVICE

224 INFERENCE UNIT

DNN-E1

225 EDGE SIDE DETERMINATION UNIT

21 QUANTIZATION UNIT

22 SUBTRACTION UNIT

INFERENCE RESULT

INPUT IMAGE 200A
230A
SERVER DEVICE
231A
INFERENCE UNIT
DNN-1
32B
DETERMINATION UNIT
INFERENCE RESULT
N
220A
EDGE DEVICE
21
QUANTIZATION UNIT
225
EDGE SIDE DETERMINATION UNIT
INFERENCE RESULT
224
INFERENCE UNIT
DNN-E1
224A
INFERENCE UNIT
DNN-2
INFERENCE RESULT
23B
RECEPTION UNIT
INPUT IMAGE

Figure 16:
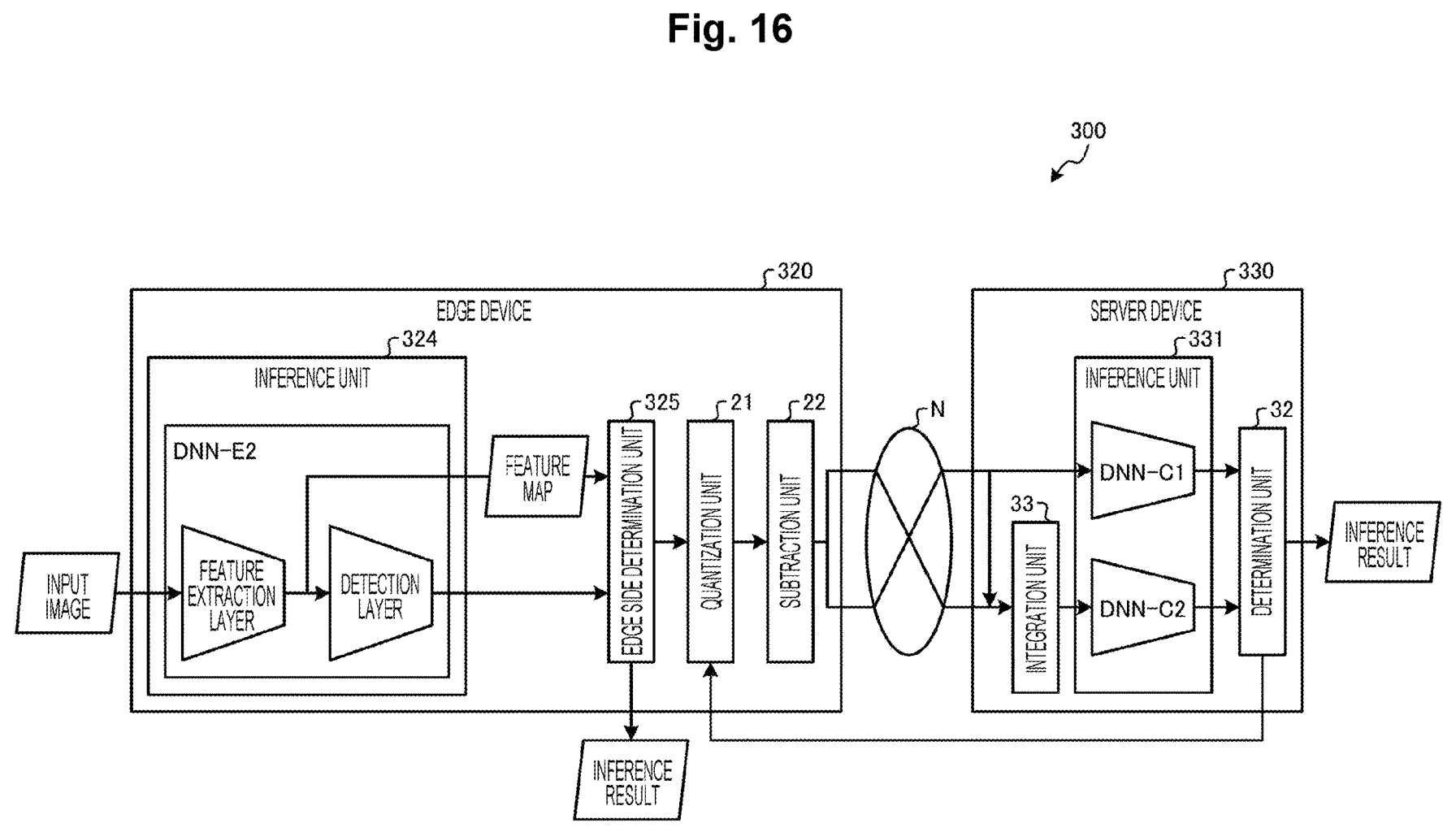

INPUT IMAGE
320 EDGE DEVICE
324 INFERENCE UNIT
DNN-E2
FEATURE EXTRACTION LAYER
DETECTION LAYER
FEATURE MAP
325 EDGE SIDE DETERMINATION UNIT
INFERENCE RESULT
21 QUANTIZATION UNIT
22 SUBTRACTION UNIT
N
330 SERVER DEVICE
33 INTEGRATION UNIT
331 INFERENCE UNIT
DNN-C1
DNN-C2
32 DETERMINATION UNIT
INFERENCE RESULT

1000
COMPUTER
1130
DISPLAY
1110
MOUSE
1120
KEYBOARD
1060
VIDEO ADAPTER
1050
SERIAL PORT INTERFACE
1080 BUS
1020
CPU
1010
MEMORY
1011
ROM
1012
RAM
1030
HARD DISK DRIVE INTERFACE
1040
DISK DRIVE INTERFACE
1070
NETWORK INTERFACE
1090
HARD DISK DRIVE
1100
DISK DRIVE
1091
OS
1092
APPLICATION PROGRAM
1093
PROGRAM MODULE
1094
PROGRAM DATA

PROCESSING METHOD, AND PROCESSING SYSTEM

CROSS-REFERENCE TO RELATED APPLICATIONS

This application is a U.S. 371 Application of International Patent Application No. PCT/JP2021/026512, filed on 14 Jul. 2021, the disclosure of which is hereby incorporated herein by reference in its entirety.

TECHNICAL FIELD

The present invention relates to a processing method and a processing system.

BACKGROUND ART

A technique for performing inference processing by adaptively sharing between an edge and a cloud has been proposed. For example, in the technology described in Non Patent Literature 1, as a result of performing inference at an edge, in a case where confidence with respect to an inference result at the edge is a predetermined value or less, data is transmitted to the cloud side, and inference is performed in the cloud. On the other hand, in the technology described in Non Patent Literature 1, in a case where the confidence exceeds a predetermined value, the result of the inference performed by the edge is provided as a response to the user.

CITATION LIST

Non Patent Literature

Non Patent Literature 1: Shohei Enomoto, Takeharu Eda, "Acceleration of Deep Learning Inference by Model Cascading," IEICE Technical Report vol. 119, Number 481, 2020, [online], [retrieved on Jun. 30, 2021], the Internet <URL: https://ipsj.ixsq.nii.ac.jp/ej/index.php?active_action=repository_view_main_item_detail&page_id=13&block_id=8&item_id=204109&item_no=1>

SUMMARY OF INVENTION

Technical Problem

However, there is still a problem as to how much information should be transmitted to the cloud side when it is determined that inference is performed on the cloud side. Here, since the transmission path is finite, it is desired to reduce the amount of information to be transmitted to the server device on the cloud side as much as possible, but the certainty of the result of inference on the cloud side that the information is insufficient becomes low. On the other hand, if more than necessary and sufficient information is transmitted to the cloud side, the certainty of the result of inference on the cloud side increases, but more transmission capacity than necessary is used.

The present invention has been made in view of the above, and an object thereof is to provide a processing method and a processing system capable of reducing the amount of transmission from an edge device to a cloud-side server device to an appropriate amount while maintaining high accuracy of an inference result in the cloud-side server device.

Solution to Problem

In order to solve the above-described problems and achieve the object, a processing method according to the present invention is a processing method for performing inference processing in an edge device and a server device, the method including a first transmission process in which the edge device transmits first data based on data to be inferred to a server device that performs first inference, and a second transmission process in which the edge device transmits second data based on the data to be inferred to an execution unit that performs second inference in response to a request from the server device, in which the request from the server device is made in a case where a result of the first inference made in the server device is equal to or less than predetermined confidence.

In addition, a processing system according to the present invention is a processing system that performs inference processing in an edge device and a server device, in which the server device includes an inference unit that, upon receiving first data based on data to be inferred from the edge device, performs first inference based on the first data using a first model, a request unit that, in a case where a result of the first inference is equal to or less than predetermined confidence, requests the edge device to transmit second data based on the data to be inferred, and upon receiving the second data, the inference unit performs second inference based on the second data using a second model.

Advantageous Effects of Invention

According to the present invention, it is possible to reduce the amount of transmission from the edge device to the server device on the cloud side to an appropriate amount while maintaining high accuracy of the inference result in the server device on the cloud side.

BRIEF DESCRIPTION OF DRAWINGS

FIG. 4 is a sequence diagram illustrating a procedure of a processing method according to Embodiment 1.

FIG. 5 is a diagram illustrating a result of performing inference only once using only a DNN-1.

FIG. 6 is a diagram illustrating a result of two-stage inference performed using the DNN-1 and a DNN-2.

FIG. 7 is a diagram illustrating a result of two-stage inference performed using the DNN-1 and the DNN-2.

FIG. 8 is a diagram illustrating a result of two-stage inference performed using the DNN-1 and the DNN-2.

FIG. 10 is a diagram schematically illustrating an example of a configuration of the processing system according to Modification Example 2 of Embodiment 1.

FIG. 12 is a diagram schematically illustrating an example of a configuration of a processing system according to Embodiment 2.

FIG. 16 is a diagram schematically illustrating an example of a configuration of a processing system according to Embodiment 3.

DESCRIPTION OF EMBODIMENTS

Figure 1:
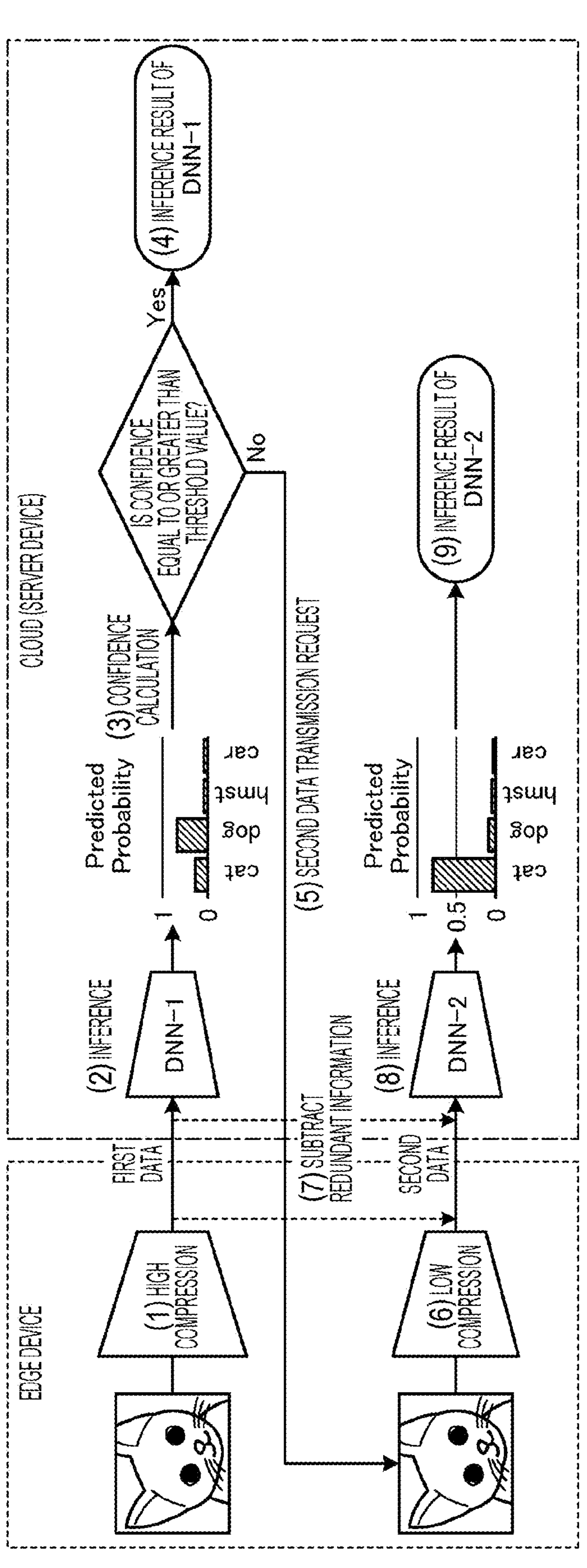
FIG. 1 is a diagram illustrating an outline of a processing method of a processing system according to Embodiment 1.

Hereinafter, an embodiment of the present invention will be described in detail with reference to the drawings. Note that the present invention is not limited by this embodiment. Further, in the description of the drawings, the same portions are denoted by the same reference numerals.

Embodiment 1

Embodiment 1 will be described. In Embodiment 1, a processing system that executes an inference process using a learned model will be described. In the processing system according to Embodiment 1, a case where a deep neural network (DNN) is used as a model used in the inference process will be described as an example. In the processing system of Embodiment 1, any neural network may be used, and signal processing with a predetermined computation amount may be used instead of the learned models.

In the processing system of Embodiment 1, it is assumed that inference is performed stepwise in a cloud side-server device instead of an edge device that is an IoT device and various terminal devices. When the data to be inferred is input, the edge device transmits the data to the server device, and as a result of performing the inference, in a case where the confidence for the inference result is less than a predetermined value, the server device requests additional information from the edge device and performs the inference again.

Outline of Processing Method of Embodiment 1

FIG. 1 is a diagram illustrating an outline of a processing method of the processing system according to Embodiment 1. As illustrated in FIG. 1, when data to be inferred is input, the edge device transmits first data based on the data to be inferred to the server device. Specifically, the edge device lossy-compresses the input data ((1) in FIG. 1) and transfers the input data as the first data.

The server device decodes the transferred first data and performs inference (first inference) in the DNN-1 ((2) in FIG. 1). The server device calculates the confidence of the inference result of the DNN-1 ((3) in FIG. 1). The confidence is a value for determining whether the processing target data should be further processed in the DNN-2. The confidence is a degree of certainty that the inference result by the DNN-1 is correct. For example, the confidence is a degree of certainty that the result of the subject recognition is correct in a case where the DNN-1 performs the subject recognition. In addition, the confidence may be a class probability of the object appearing in the image output by the DNN-1, for example, the highest class probability.

In a case where the confidence is equal to or greater than the predetermined threshold value, the server device outputs the inference result of the DNN-1 ((4) in FIG. 1). In a case where the confidence is less than the predetermined threshold value, the server device requests the edge device to transmit additional second data ((5) in FIG. 1).

The edge device transmits the second data based on the data to be inferred to the server device in response to a request from the server device. Specifically, the edge device lossy-compresses the input data at a compression rate lower than the compression rate for the first data ((6) in FIG. 1). At this time, the edge device suppresses the transmission amount from the edge device to the server device by subtracting redundant information also included in the first data from the compressed data and then transferring the data as the second data ((7) in FIG. 1). The second data is data that does not include a region common to the first data.

The server device integrates the second data and the first data. Therefore, using the second data and the first data at the same time, the data to be inferred is better expressed by either one of the data. The server device performs inference (second inference) by inputting the integrated data to the DNN-2 ((8) in FIG. 1), and outputs an inference result of the DNN-2 ((9) in FIG. 1).

As described above, in a case where the confidence is less than the predetermined threshold value, the server device holds the confidence of the inference result by performing inference further using the additional second data transferred from the edge device.

[Processing System]

Figure 2:
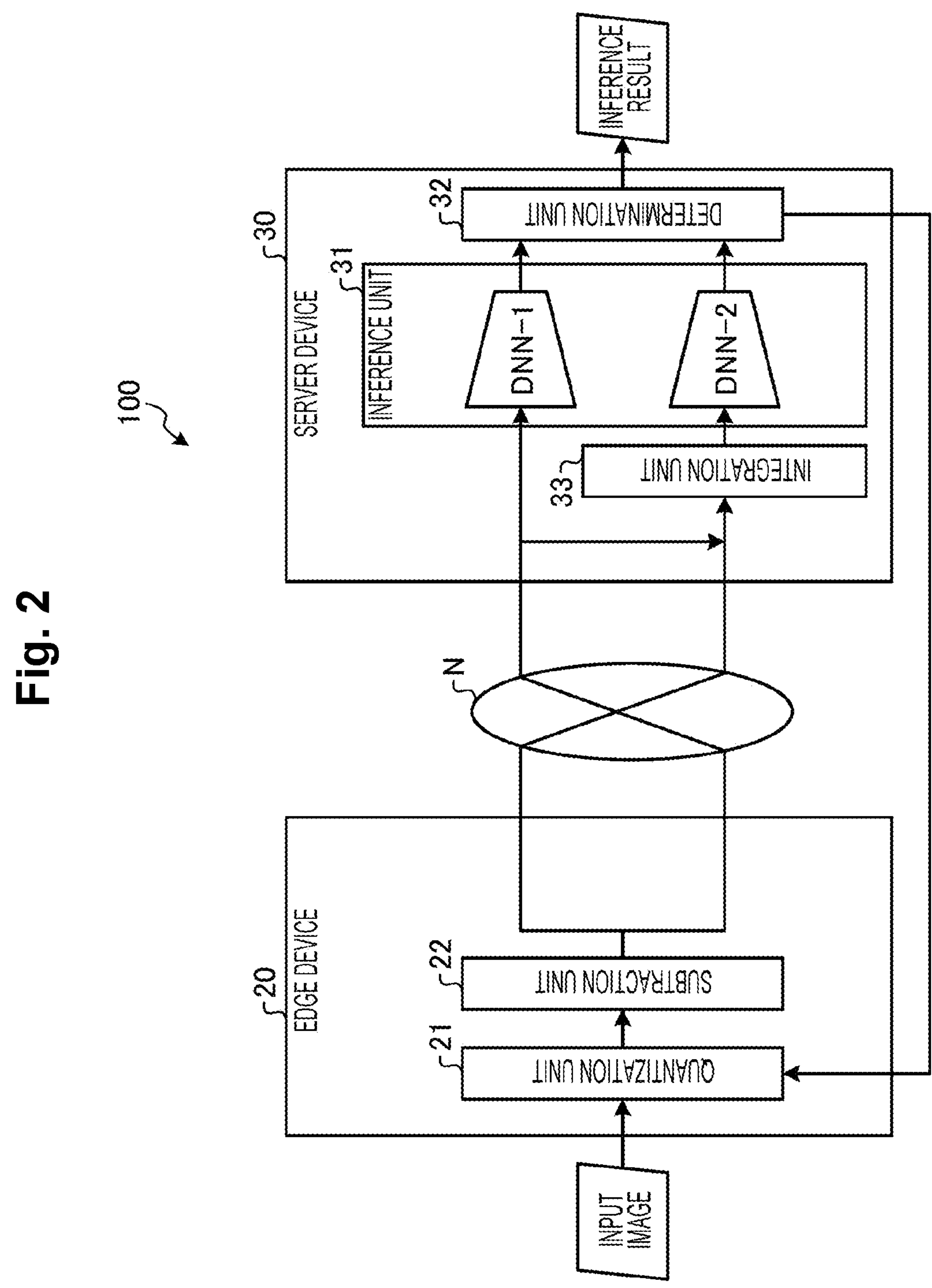
FIG. 2 is a diagram schematically illustrating an example of a configuration of a processing system according to Embodiment 1.

FIG. 2 is a diagram schematically illustrating an example of a configuration of the processing system according to Embodiment 1. A processing system 100 according to Embodiment 1 includes an edge device 20 and a server device 30.

The edge device 20 is an IoT device and any of various terminal devices disposed at a place physically and logically close to a user, and has fewer resources than the server device 30. The server device 30 is a device disposed at a logically distant place when compared with the edge device 20. The server device 30 and the edge device 20 are connected via a network N. The network N is, for example, the Internet.

The edge device 20 transmits first data based on the data to be inferred (an image in the example of FIG. 2) to the server device. The edge device 20 transmits first data obtained by quantizing the data to be inferred by the number of the first quantization bits to the server device 30. The edge device 20 transmits the second data based on the inference target to the server device in response to a request from the server device 30. Upon receiving the transmission request of the second data from the server device 30, the edge device 20 transmits the second data obtained by quantizing the data to be inferred with the number of the second quantization bits having the number of bits greater than the number of the first quantization bits to the server device 30. The edge device 20 may transmit, as the second data, data obtained by subtracting duplication data with the first data from data obtained by quantizing the input image with the number of the second quantization bits.

The server device 30 adaptively performs inference processing using the DNN-1 and the DNN-2 on the data to be inferred transmitted from the edge device 20. The server device 30 inputs the first data to the DNN-1 to perform inference processing. In a case where the confidence of the inference result of the DNN-1 of the DNN-1 is less than the predetermined threshold value, the server device 30 requests the edge device 20 to transmit the second data. The server device 30 inputs the second data to the DNN-2 and performs inference processing. In the present embodiment, as an example, a case where the DNN-1 and the DNN-2 perform inference related to the same task will be described as an example.

The edge device 20 and the server device 30 are implemented by causing a computer or the like including a read-only memory (ROM), a random access memory (RAM), and a central processing unit (CPU) to read a predetermined program, and causing the CPU to execute the predetermined program. A so-called accelerator represented by a GPU, a vision processing unit (VPU), a field programmable gate array (FPGA), an application specific integrated circuit (ASIC), and a dedicated artificial intelligence (AI) chip is also used. Each of the edge device 20 and the server device 30 includes a network interface card (NIC) and can execute communication with another device via an electrical communication line such as a local area network (LAN) or the Internet.

[Edge Device]

As illustrated in FIG. 2, the edge device 20 includes a quantization unit 21 and a subtraction unit 22.

The quantization unit 21 performs a first quantization process for generating first data obtained by quantizing the data to be inferred (for example, an image) by the number of the first quantization bits, and transmits the first data to the server device 30. In addition, upon receiving a transmission request of the second data from the server device 30, the quantization unit 21 performs second quantization processing of quantizing the data to be inferred with the number of second quantization bits having the number of bits greater than the number of the first quantization bits.

The subtraction unit 22 generates second data obtained by subtracting redundant information common to the first data from the quantized data quantized by the second quantization processing, and transmits the second data to the server device 30. Note that the edge device 20 may quantize and encode the first data and the second data, and then transmit the quantized data to the server device 30.

[Server Device]

The server device 30 includes an inference unit 31, a determination unit 32, and an integration unit 33.

The inference unit 31 performs inference using the learned DNN-1 and DNN-2. The DNN-1 and the DNN-2 include information such as model parameters. In a case of receiving the first data, the inference unit 31 restores (dequantizes) the first data and then inputs the first data to the DNN-1 to perform inference on the data to be inferred. In addition, upon receiving input of integrated data obtained by integrating the first data and the second data from the integration unit 33 (described later), the inference unit 31 dequantizes the integrated data and then inputs the integrated data to the DNN-2 to perform inference on the data to be inferred.

Note that the DNN-1 and the DNN-2 may dequantize data. In addition, in a case where the DNN-1 and the DNN-2 themselves are quantized, dequantization is unnecessary. Furthermore, the DNN-1 and the DNN-2 may have different or the same inference accuracy. Furthermore, the DNN-1 and the DNN-2 may be obtained by relearning the models according to the number of the quantization bits of the input data in order to further improve the accuracy. Furthermore, the DNN-2 may be omitted, and inference based on the first data or the integrated data may be performed only with the DNN-1.

The determination unit 32 calculates the confidence of the inference result using the DNN-1. In a case where the confidence is equal to or greater than a predetermined threshold value, the determination unit 32 outputs an inference result using the DNN-1. On the other hand, in a case where the confidence is less than the predetermined threshold value, the determination unit 32 requests the edge device 20 to transmit additional second data. Then, in a case where inference is performed using the DNN-2, the determination unit 32 outputs an inference result using the DNN-2.

In a case of receiving the second data from the edge device 20, the integration unit 33 integrates the first data and outputs the integrated data to the inference unit 31.

[Flow of Processing]

Figure 3:
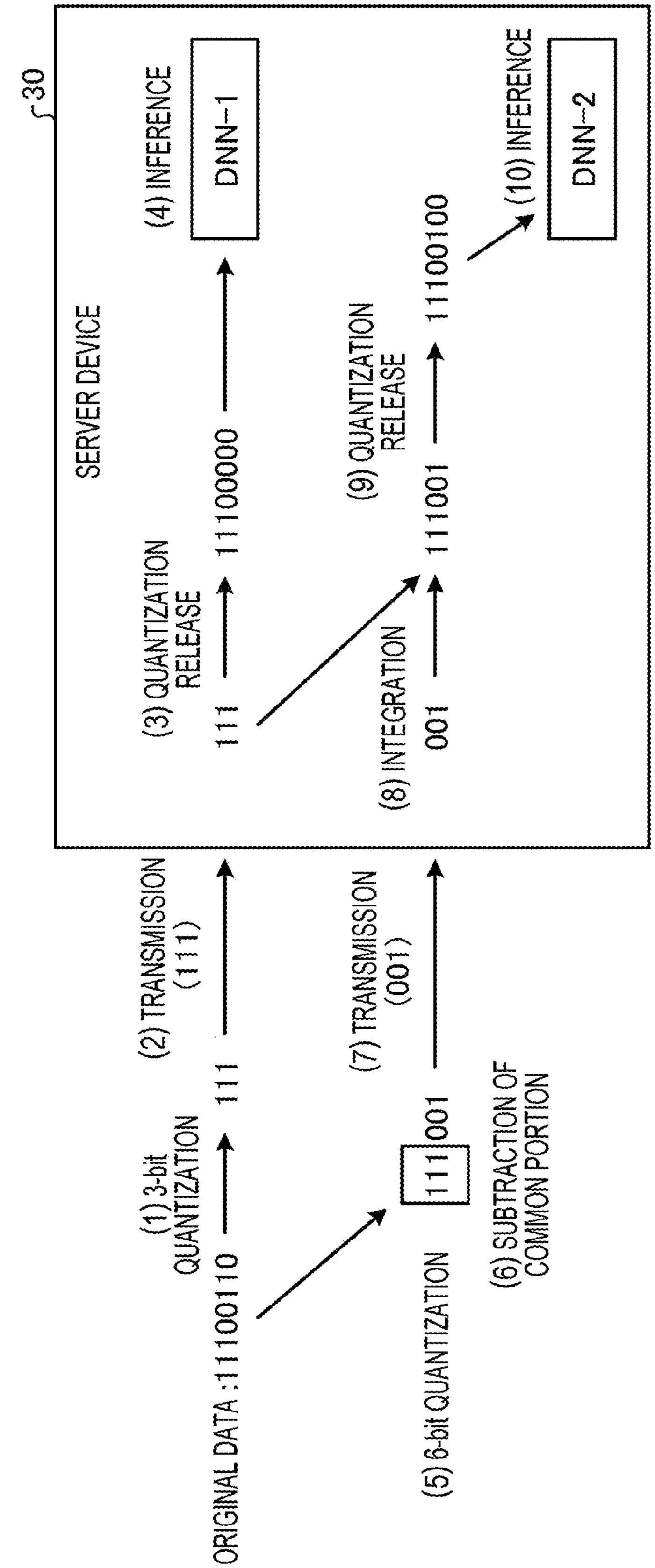
FIG. 3 is a diagram for illustrating an example of a flow of processing in the processing system illustrated in FIG. 2.

A flow of processing in a processing system 100 will be described. FIG. 3 is a diagram for illustrating an example of a flow of processing in the processing system 100 illustrated in FIG. 2. In FIG. 3, for ease of description, data to be inferred will be described as "11100110" of 8-bit data.

When the original data "11100110" is input, the edge device 20 transmits, for example, "111" quantized in 3 bits to the server device 30 as first data ((1) and (2) in FIG. 3).

In the server device 30, "11100000" obtained by dequantizing the first data "111" is input to the DNN-1 and inference is performed ((3) and (4) in FIG. 3). In a case where the confidence is equal to or greater than a predetermined threshold value, the server device 30 outputs an inference result using the DNN-1. On the other hand, in a case where the confidence is less than the predetermined threshold value, the server device 30 requests the edge device 20 to transmit additional second data in a case where the confidence is less than the predetermined threshold value.

upon receiving the second data transmission request, the edge device 20 transmits, as the second data to the server device 30, "001" obtained by subtracting a common part "111" with the first data "111" from "111001" obtained by quantizing the original data "11100110" by, for example, 6 bits ((5) to (7) in FIG. 3).

The server device 30 integrates the first data "111" and the second data "001," and inputs "11100100" obtained by dequantizing the integrated data "111001" to the DNN-2 to perform inference ((8) to (10) in FIG. 3). The server device 30 outputs the inference result of the DNN-2.

[Processing Procedure of Processing System]

FIG. 4 is a sequence diagram illustrating a procedure of a processing method according to Embodiment 1.

As illustrated in FIG. 4, first, when the input of the data to be inferred (for example, an image) is received in the edge device 20 (Step S1), the quantization unit 21 performs first quantization processing of generating first data obtained by quantizing the data to be inferred with the first quantization bit number (Step S2), and transmits the first data to the server device 30 (Steps S3 and S4).

In the server device 30, the inference unit 31 inputs the first data to the DNN-1 and performs inference (Step S5). When the inference result of the DNN-1 is input (Step S6), the determination unit 32 calculates confidence of the inference result using the DNN-1 (Step S7). Then, the determination unit 32 determines whether the confidence is equal to or greater than a predetermined threshold value (Step S8).

In the server device 30, in a case where the confidence is equal to or greater than the predetermined threshold value (Step S8: Yes), the determination unit 32 outputs the inference result using the DNN-1 (Step S9). On the other hand, in a case where the confidence is less than the predetermined threshold value (Step S8: No), the determination unit 32 requests the edge device 20 to transmit additional second data (Step S10).

In the edge device 20, when the transmission request of the second data is received from the server device 30, the quantization unit 21 performs second quantization processing of quantizing the data to be inferred with the number of the second quantization bits (Steps S11 and S12). The subtraction unit 22 generates second data obtained by subtracting redundant information common to the first data from the quantized data quantized by the second quantization processing (Step S13) and transmits the second data to the server device 30 (Step S14).

In the server device 30, the integration unit 33 integrates the received second data with the first data (Step S15), and outputs the integrated data to the inference unit 31 (Step S16). The inference unit 31 inputs the integrated data to the DNN-2 to perform inference (step S17). The determination unit 32 outputs the inference result using the DNN-2 (Steps S18 and S9).

Effects of Embodiments

[Evaluation Experiment]

Here, the inference accuracy and the number of transmission bits of data from the edge device 20 to the server device 30 are evaluated using ResNet-50 as the DNN-1 and the DNN-2. FIG. 5 is a diagram illustrating a result of performing inference only once using only the DNN-1. FIGS. 6 to 8 are diagrams illustrating a result of two-stage inference performed using the DNN-1 and the DNN-2.

As illustrated in FIG. 5, as the number of quantization bits of quantization in the edge device 20 increases, the inference accuracy of the DNN-1 increases, but the number of transmission bits of data from the edge device 20 to the server device 30 tends to increase.

Here, in a case of comparing a case where the inference is performed in two stages based on the first data and the second data obtained by quantizing with the number of the first quantization bits set to 3, 4, or 5 and the number of the second quantization bits set to 4, 5, or 6 (see FIG. 6) and a case where the inference is performed only once using each data obtained by quantizing with the number of quantization bits of 3, 4, or 5 (see FIG. 5), it has been found that the inference is performed in two stages with higher accuracy. Furthermore, in a case where inference is performed in two stages (see FIG. 6), the number of transmission bits of data from the edge device 20 to the server device 30 can be reduced as compared with a case where inference is performed only once (see FIG. 5) using each data obtained by quantizing with the number of quantization bits of 4, 5, or 6.

Therefore, according to Embodiment 1, in the two-stage inference in the server device 30, the number of the second quantization bits is set to the number of bits greater than the number of the first quantization bits and the first data and the second data are transmitted, so that the improvement of the inference accuracy and the appropriate amount of data transmission from the edge device 20 to the server device 30 can be realized.

As illustrated in FIGS. 7 and 8, by making the number of the second quantization bits greater than the number of first quantization bits by about 2 bits, there is a tendency that the accuracy can be held more stably. When Present Embodiment 1 is applied, the evaluation as in the present example is performed, and the threshold values of the number of the first quantization bits, the number of the second quantization bits, and the confidence may be set in a trade-off between the inference accuracy and the number of transmission bits of data from the edge device 20 to the server device 30.

Modification Example 1 of Embodiment 1

Figure 9:
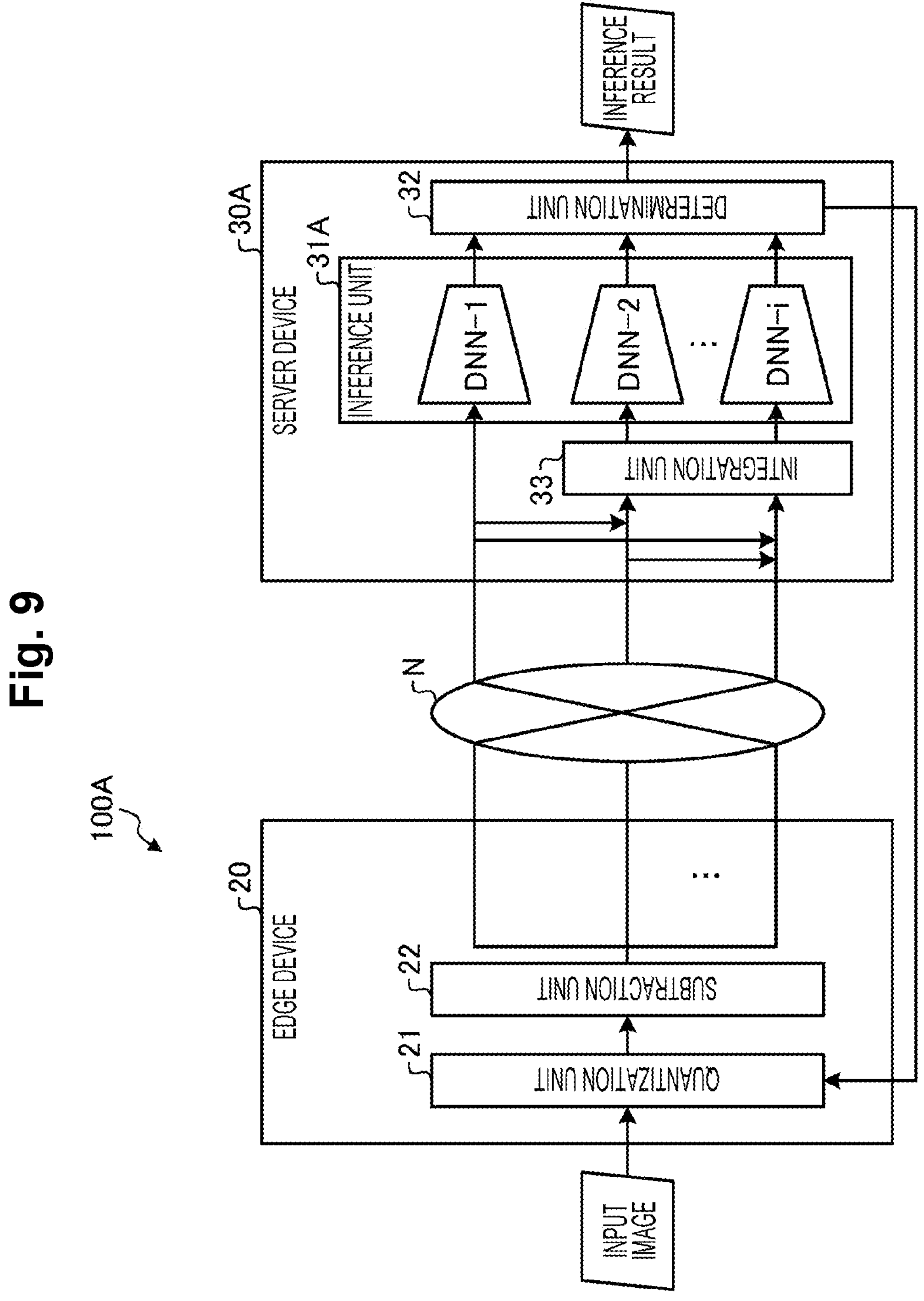
FIG. 9 is a diagram schematically illustrating an example of a configuration of a processing system according to Modification Example 1 of Embodiment 1.

In Embodiment 1, the case where two-stage inference is performed in the server device has been described as an example, but multi-stage inference is also possible. FIG. 9 is a diagram schematically illustrating an example of a configuration of the processing system according to Modification Example 1 of Embodiment 1.

In a processing system 100A illustrated in FIG. 9, a server device 30A executes multi-stage inference using i DNN-1 to DNN-i. The edge device 20 may perform quantization by sequentially increasing the number of the quantization bits according to the number of times of data transmission by the server device 30A.

The server device 30A includes an inference unit 31A including i DNN-1 to DNN-i. The determination unit 32 calculates the confidence of the input inference result in the order of DNN-1 to DNN-(i−1), and outputs the inference result in which the confidence is equal to or greater than a predetermined threshold value. In a case where the inference result of the DNN-i is input, the determination unit 32 outputs the inference result. When the second data to the i-th data are input, the integration unit 33 integrates the first data and the second data to the i-th data input so far.

As described above, in the processing system 100A, by executing the multi-stage inference using the DNN-1 to DNN-i, it is possible to realize more stable holding of inference accuracy.

Modification Example 2 of Embodiment 1

In addition, the second inference may be performed in the edge device. FIG. 10 is a diagram schematically illustrating an example of a configuration of the processing system according to Modification Example 2 of Embodiment 1.

As illustrated in FIG. 10, a processing system 100B according to Modification Example 2 of Embodiment 1 includes an edge device 20B and a server device 30B.

The edge device 20B includes a reception unit 23B that distributes the input data to be inferred (image in the figure) to the quantization unit 21 or the inference unit 24B, and an inference unit 24B that includes the DNN-2 and performs second inference.

The server device includes an inference unit 31B and a determination unit 32B. The inference unit 31B includes the DNN-1 and performs first inference. In a case where the confidence of the first inference result using the DNN-1 is equal to or greater than a predetermined threshold value, the determination unit 32B outputs the inference result using the DNN-1. On the other hand, in a case where the confidence is less than the predetermined threshold value, the determination unit 32B requests the edge device 20 to execute the second inference.

[Processing Procedure of Processing System]

Figure 11:
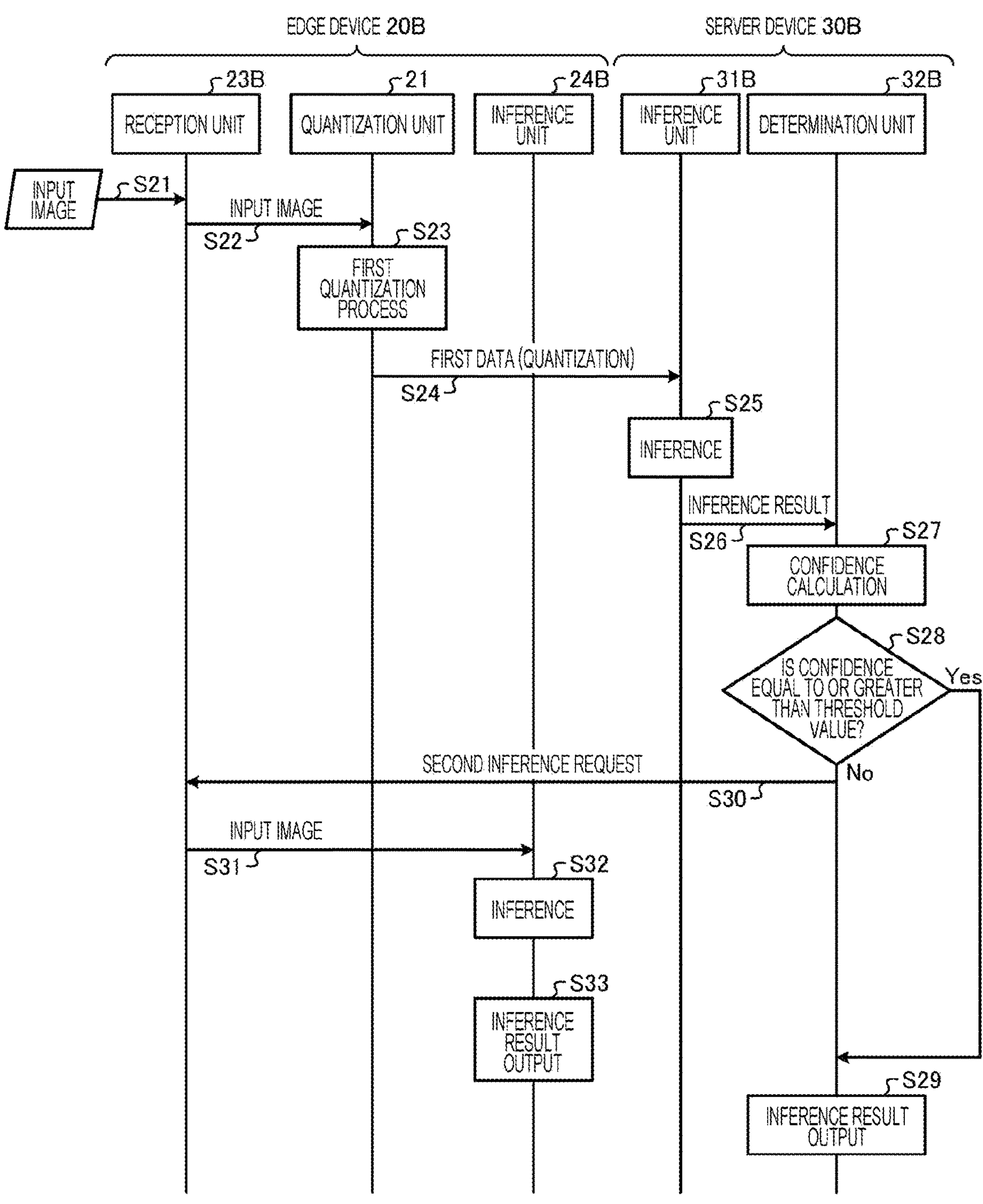
FIG. 11 is a sequence diagram illustrating a procedure of a processing method according to Modification Example 2 to Embodiment 1.

FIG. 11 is a sequence diagram illustrating a procedure of a processing method according to Modification Example 2 of Embodiment 1.

As illustrated in FIG. 11, first, in the edge device 20B, upon receiving the input of the data to be inferred (for example, an image) (Step S21), the reception unit 23B outputs the data to be inferred to the quantization unit 21 (Step S22). The quantization unit 21 performs first quantization processing for generating first data obtained by quantizing the data to be inferred by the number of the first quantization bits (Step S23), and transmits the first data to the server device 30B (Step S24).

In the server device 30, the inference unit 31B inputs the first data to the DNN-1 and performs first inference (Step S25). When the inference result of the DNN-1 is input (Step S26), the determination unit 32B calculates confidence of the inference result using the DNN-1 (Step S27). Then, the determination unit 32 determines whether the confidence is equal to or greater than a predetermined threshold value (Step S28).

In the server device 30B, in a case where the confidence is equal to or greater than the predetermined threshold value (Step S28: Yes), the determination unit 32B outputs the inference result using the DNN-1 (Step S29). On the other hand, in a case where the confidence is less than the predetermined threshold value (Step S28: No), the determination unit 32B requests the edge device 20 to execute the second inference (Step S30).

When the edge device 20 receives the second inference execution request from the server device 30, the reception unit 23B transmits data to be inferred to the inference unit 24B (Step S31). The inference unit 24B inputs data to be inferred to the DNN-2 to perform second inference (Step S32), and outputs an inference result (Step S33). Note that, in a case where the inference result is output from the server device 30B, the edge device 20B may transmit the inference result by the DNN-2 to the server device 30B.

As in the processing system 100B, the DNN-2 that performs the second inference may be provided in the edge device 20B. Since the DNN-2 performs inference using the uncompressed data, it is possible to perform highly accurate inference. In addition, in the processing system 100B, since it is not necessary to transmit the second data from the edge device 20B to the server device 30B for the second inference, the communication amount between the edge device 20B and the server device 30B can be reduced.

Embodiment 2

Next, Embodiment 2 will be described. Embodiment 2 describes a case where Embodiment 1 is applied to a cascade model.

FIG. 12 is a diagram schematically illustrating an example of a configuration of the processing system according to Embodiment 2. The processing system 200 according to Embodiment 2 includes an edge device 220 that performs inference using a DNN-E1 that is a lighter model than the DNN-1 and the DNN-2 instead of the edge device 20 illustrated in FIG. 2.

The edge device 220 includes an inference unit 224, an edge-side determination unit 225, the quantization unit 21, and the subtraction unit 22.

The inference unit 224 performs inference (third inference) using the DNN-E1 that is a learned lightweight model. The DNN-E1 includes information such as a model parameter. The DNN-E1 may perform inference processing related to the same task as the DNN-1 and the DNN-2, or may perform inference processing related to a different task.

The edge-side determination unit 225 determines which inference result of the edge device 220 or the server device 30 is adopted by comparing the confidence of the inference result using the DNN-E1 with a predetermined threshold value. In a case where the confidence is equal to or greater than a predetermined threshold value, the edge-side determination unit 225 outputs the inference result inferred by the inference unit 224.

On the other hand, in a case where the confidence is less than the predetermined threshold value, the edge-side determination unit 225 inputs the data to be inferred to the quantization unit 21. As a result, the data to be inferred is quantized with the number of first quantization bits and transmitted to the server device 30 as the first data. In the server device 30, the two-stage inference is executed using the first data and the second data transmitted from the edge device 220. Note that the threshold value used for the determination by the edge-side determination unit 225 may be a value different from or the same as the threshold value used by the determination unit 32.

[Processing Procedure of Processing System]

Figure 13:
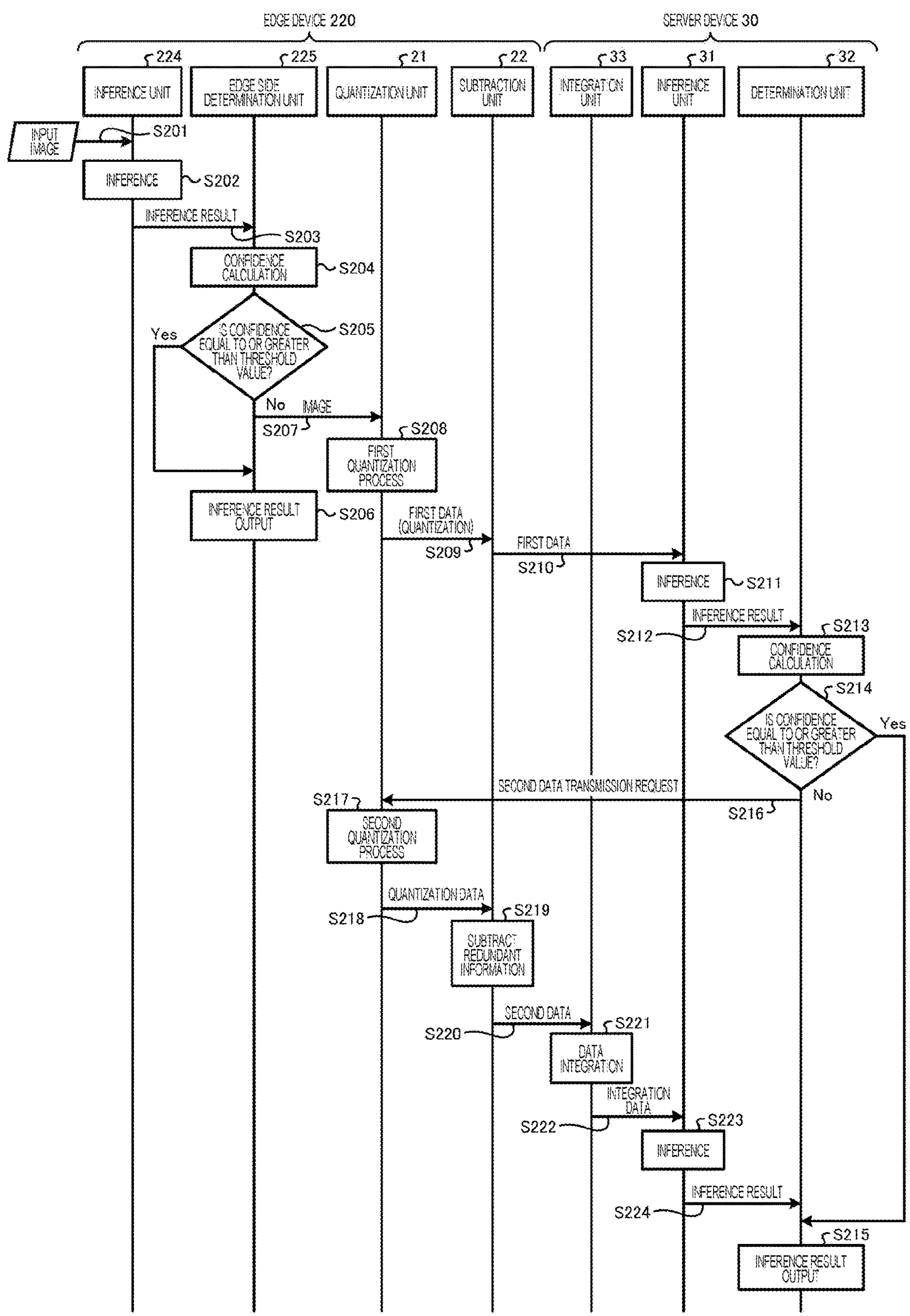
FIG. 13 is a sequence diagram illustrating a procedure of a processing method according to Embodiment 2.

FIG. 13 is a sequence diagram illustrating a procedure of a processing method according to Embodiment 2.

As illustrated in FIG. 13, first, in the edge device 220, upon receiving an input of data to be inferred (for example, an image) (Step S201), the inference unit 224 performs inference using the DNN-E1 (Step S202), and outputs an inference result to the edge-side determination unit 225 (Step S203). The edge-side determination unit 225 determines whether the confidence is equal to or greater than a predetermined threshold value (Step S204).

In a case where the confidence is equal to or greater than the predetermined threshold value (Step S205: Yes), the edge-side determination unit 225 outputs the inference result inferred by the inference unit 224 (Step S206). In a case where the confidence is less than the predetermined threshold value (Step S205: No), the edge-side determination unit 225 inputs the data to be inferred to the quantization unit 21 (Step S207). Steps S208 to S224 are the same processing procedures as Steps S2 to S18 illustrated in FIG. 4.

Effects of Embodiment 2

As described in Embodiment 2, by applying Embodiment 1 to the cascade model, the multi-stage inference in the server device 30 may be performed, and stable inference accuracy may be maintained.

Modification Example of Embodiment 2

Figure 14:
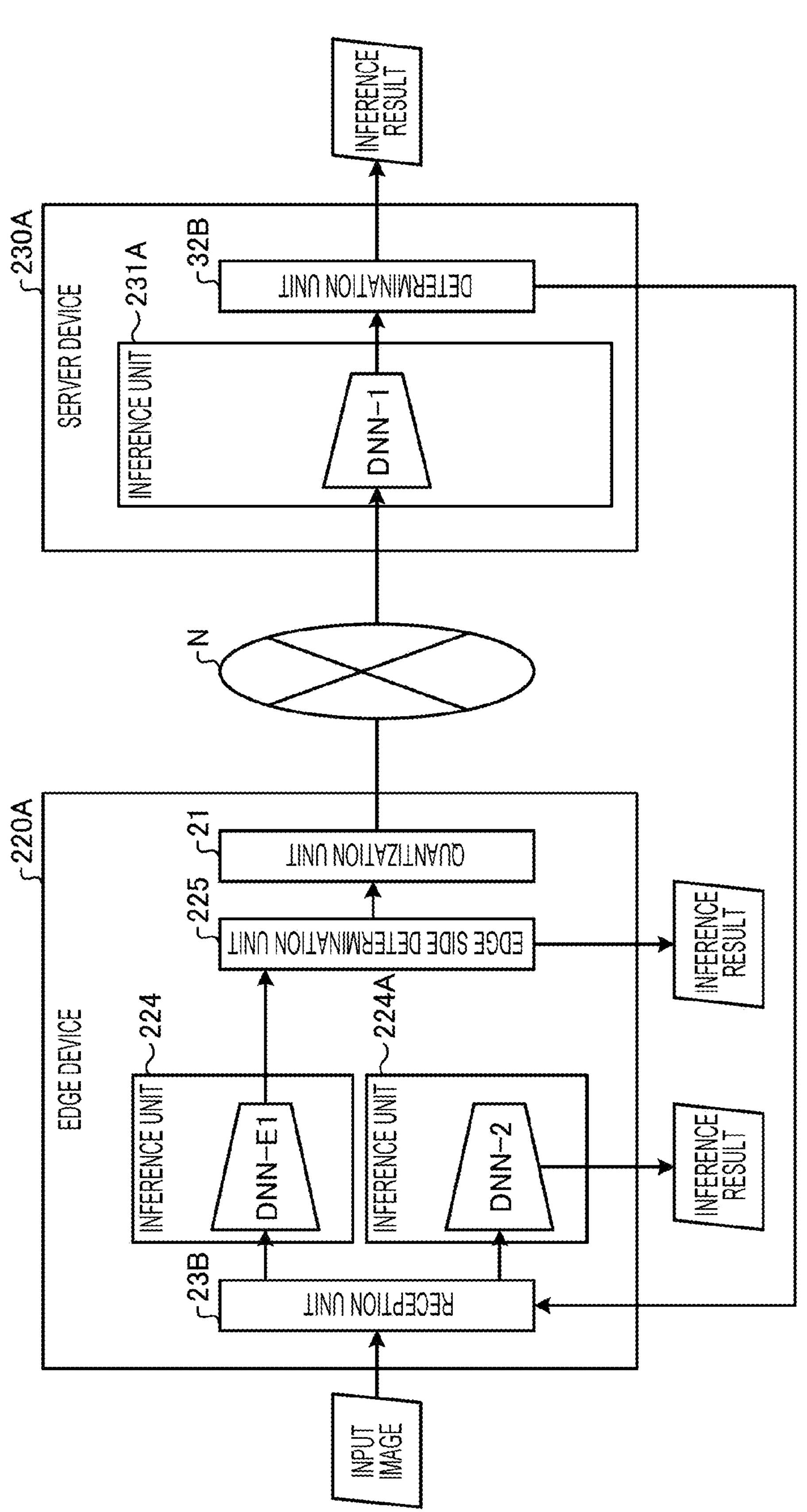
FIG. 14 is a diagram schematically illustrating an example of a configuration of a processing system according to a modification example of Embodiment 2.

In addition, the second inference may be performed in the edge device. FIG. 14 is a diagram schematically illustrating an example of a configuration of the processing system according to a modification example of Embodiment 2.

As illustrated in FIG. 14, a processing system 200A according to a modification example of Embodiment 2 includes an edge device 220A and a server device 230A.

The edge device 220A has a configuration in which the subtraction unit 22 is deleted as compared with the edge device 220. As compared with the edge device 220, the edge device 220A includes the reception unit 23B that distributes input data to be inferred (image in the figure) to the quantization unit 21, the inference unit 224, or the inference unit 224A, and the inference unit 224B that includes the DNN-2 and performs second inference.

The server device includes an inference unit 231A and the determination unit 32B. The inference unit 231B includes the DNN-1 and performs first inference. In a case where the confidence of the first inference result using the DNN-1 is equal to or greater than a predetermined threshold value, the determination unit 32B outputs the inference result using the DNN-1. On the other hand, in a case where the confidence is less than the predetermined threshold value, the determination unit 32B requests the edge device 220A to execute the second inference.

[Processing Procedure of Processing System]

Figure 15:
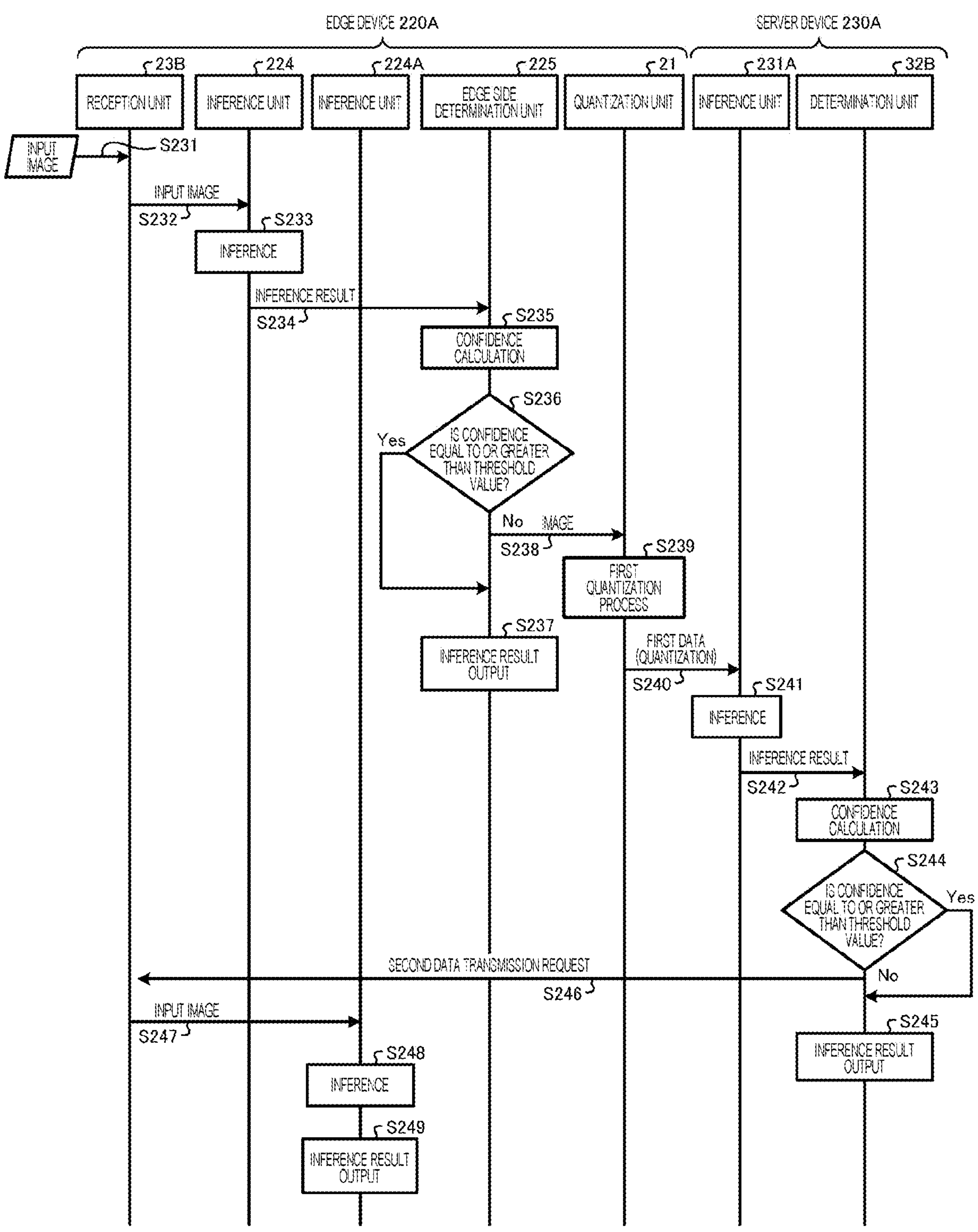
FIG. 15 is a sequence diagram illustrating a procedure of a processing method according the modification example of Embodiment 2.

FIG. 15 is a sequence diagram illustrating a procedure of a processing method according to a modification example of Embodiment 2.

As illustrated in FIG. 15, first, in the edge device 220A, upon receiving the input of the data to be inferred (for example, an image) (Step S231), the reception unit 23B outputs the data to be inferred to the inference unit 224 (Step S232). Steps S233 to S239 in FIG. 15 are the same processing as Steps S202 to S208. The quantization unit 21 transmits the first data to the server device 230A (Step S240).

In the server device 230A, the inference unit 231A inputs the first data to the DNN-1 and performs first inference (Step S241). When the inference result of the DNN-1 is input (Step S242), the determination unit 32B calculates confidence of the inference result using the DNN-1 (Step S243). Then, the determination unit 32 determines whether the confidence is equal to or greater than a predetermined threshold value (Step S244).

In the server device 230A, in a case where the confidence is equal to or greater than the predetermined threshold value (Step S244: Yes), the determination unit 32B outputs the inference result using the DNN-1 (Step S245). On the other hand, in a case where the confidence is less than the predetermined threshold value (Step S244: No), the determination unit 32B requests the edge device 220A to execute the second inference (Step S246).

When the edge device 220A receives the second inference execution request from the server device 230A, the reception unit 23B transmits data to be inferred to the inference unit 224A (Step S247). The inference unit 224A inputs data to be inferred to the DNN-2 to perform second inference (Step S248), and outputs an inference result (Step S249). Note that, in a case where the inference result is output from the server device 230A, the edge device 220A may transmit the inference result by the DNN-2 to the server device 230A.

As in the processing system 200A, a configuration in which the DNN-2 that performs the second inference is provided in the edge device 220A may be applied to the cascade model. According to the processing system 200A, since the DNN-2 performs inference using the uncompressed data, it is possible to perform highly accurate inference. In addition, in the processing system 200A, since it is not necessary to transmit the second data from the edge device 220A to the server device 230A for the second inference, the communication amount between the edge device 220A and the server device 230A can be reduced.

Embodiment 3

Next, Embodiment 3 will be described. Embodiment 3 will describe a case where Embodiment 1 is applied to an edge cloud system in which a feature map that is an intermediate output value of a model on the edge device side can be shared between the edge device and the server device.

FIG. 16 is a diagram schematically illustrating an example of a configuration of the processing system according to Embodiment 3. The processing system 300 according to Embodiment 3 includes an edge device 320 that performs inference (fourth inference) using the DNN-E2 that is a lightweight model, and a server device 330 including DNN-C1 and DNN-C2 that are non-lightweight models. The edge device 320 includes an inference unit 324, an edge-side determination unit 325, the quantization unit 21, and the subtraction unit 22.

The inference unit 324 uses the DNN-E2 that is a learned lightweight model to perform inference on data to be inferred. The DNN-E2 includes information such as a model parameter. The inference unit 324 inputs data to be inferred (an image in the example of FIG. 16) to the DNN-E2 to acquire an inference result. In the inference unit 31, the feature extraction layer of DNN-E2 extracts a feature amount of data to be inferred and outputs the feature amount as a feature map, and the detection layer of the DNN-E2 performs inference on the data to be inferred based on the feature map.

Similarly to the edge-side determination unit 225 illustrated in FIG. 12, the edge-side determination unit 325 determines which inference result of the edge device 320 or the server device 330 is adopted by comparing the confidence of the inference result using the DNN-E2 with a predetermined threshold value. In a case where the confidence is equal to or greater than a predetermined threshold value, the edge-side determination unit 325 outputs the inference result inferred by the inference unit 324.

On the other hand, in a case where the confidence is less than the predetermined threshold value, the edge-side determination unit 325 inputs the feature map that is the intermediate output value of the DNN-E2 to the quantization unit 21. Note that the threshold value used for the determination by the edge-side determination unit 325 may be a value different from or the same as the threshold value used by the determination unit 32.

In Embodiment 3, processing targets of the quantization unit 21 and the subtraction unit 22 are feature maps. The feature map is transmitted to the server device 330 as first data or second data after quantization as in Embodiment 1. The quantization unit 21 transmits the feature map quantized with the number of the first quantization bits to the server device 330 as first data.

Furthermore, the subtraction unit 22 transmits data obtained by subtracting redundant information common to the first data from the feature map quantized by the quantization unit 21 with the number of the second quantization bits as second data to the server device 330. In the server device 330, the two-stage inference is executed using the first data and the second data based on the feature map transmitted from the edge device 320.

[Server Device]

The server device 330 includes an inference unit 331, the determination unit 32, and an integration unit 333.

The inference unit 331 uses DNN-C1 or DNN-C2 to execute inference processing for the data to be inferred based on the feature map of the data to be inferred output from the edge device 320. The DNN-C1 and the DNN-C2 perform inference using the feature amount map as an input. The DNN-C1 performs inference (first inference) using the feature map quantized with the number of the first quantization bits as an input. The DNN-C2 performs inference (second inference) using integrated data obtained by integrating the feature map quantized with the number of the first quantization bits and the feature map quantized with the number of the second quantization bits as an input.

In a case of receiving the feature map quantized with the number of second quantization bits from the edge device 320, the integration unit 33 integrates the feature map with the feature map quantized with the number of the first quantization bits and outputs the integrated data to the inference unit 331.

[Processing Procedure of Processing System]

Figure 17:
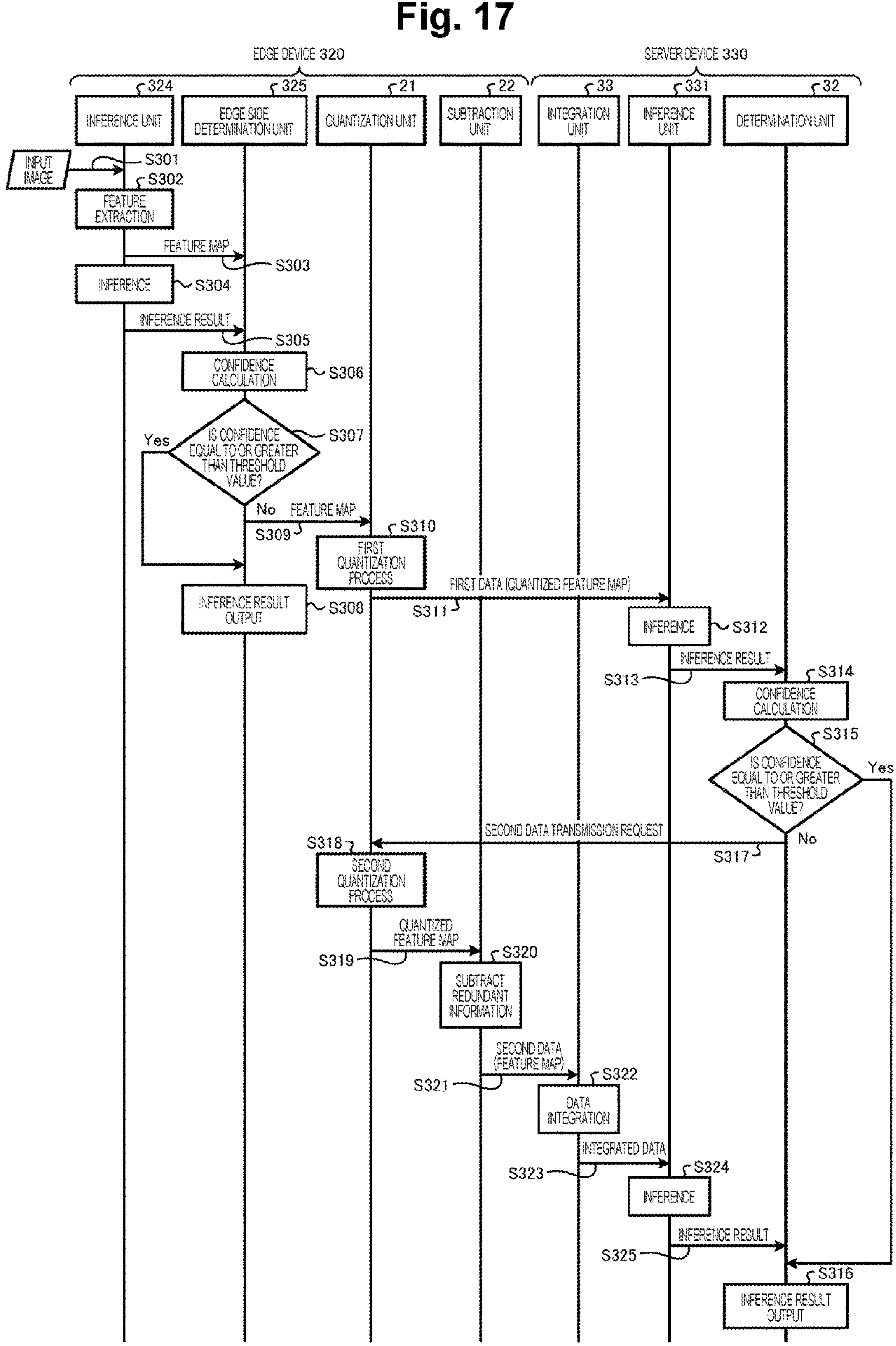
FIG. 17 is a sequence diagram illustrating a procedure of a processing method according to Embodiment 3.

FIG. 17 is a sequence diagram illustrating a procedure of a processing method according to Embodiment 3.

As illustrated in FIG. 17, first, when the edge device 320 receives an input of the data to be inferred (for example, an image) (Step S301), the inference unit 324 inputs the data to be inferred (for example, an image) to the DNN-E2. In the DNN-E2, the feature extraction layer extracts a feature amount of data to be inferred as a feature map (Step S302) and outputs the feature amount to the edge-side determination unit 325 (Step S303). In the DNN-E2, the detection layer executes inference for data to be inferred based on the feature map (Step S304), and outputs an inference result to the determination unit 32 (Step S305).

The edge-side determination unit 325 determines whether the confidence is equal to or greater than a predetermined threshold value (Step S307). In a case where the confidence is equal to or greater than the predetermined threshold value (Step S307: Yes), the edge-side determination unit 325 outputs the inference result inferred by the inference unit 324 (Step S308). In a case where the confidence is less than the predetermined threshold value (Step S307: No), the edge-side determination unit 325 inputs the feature map to the quantization unit 21 (Step S309). Steps S310 to S325 are the same processing procedures as Steps S2 to S18 illustrated in FIG. 4 except that the data input to the quantization unit 21 is the feature map.

Effects of Embodiment 3

As described in Embodiment 3, by applying Embodiment 1 to an edge cloud system capable of sharing a feature map that is an intermediate output value of a model on the edge device side, multi-stage inference in the server device 330 may be performed, and stable inference accuracy may be maintained.

Note that, also in Embodiment 3, the second inference can be performed in the edge device. In this case, the server device has a configuration in which the integration unit 33 and the DNN-C2 are deleted as compared with the server device 330, and includes the determination unit 32B instead of the determination unit 32. The edge device further includes a second inference unit having the DNN-C2 as compared with the edge device 320. In the edge device, upon receiving the execution request of the second inference from the determination unit 32B in the server device, the feature map that is the intermediate output value of the DNN-E2 is input to the DNN-C2 of the second inference unit, the second inference is performed, and the inference result is output.

Furthermore, in Present Embodiments 1 to 3, the case where the data transmitted from the edge devices 20, 20B, 220, 220A, and 320 to the server devices 30, 30A, 30B, 230A, and 330 is quantized has been described as an example, but the present invention is not limited thereto, and progressive encoding may be performed in the case of data image data to be inferred. Furthermore, in the case of Modification Example 2 of Embodiment 1 or the modification example of Embodiment 2, a compression method such as normal image encoding or video encoding may be used.

Furthermore, in the present embodiment, a plurality of edge devices 20, 20B, 220, 220A, and 320 or a plurality of server devices 30, 30A, 30B, 230A, and 330 may be provided, and a plurality of edge devices 20, 20B, 220, 220A, and 320 and server devices 30, 30A, 30B, 230A, and 330 may be provided.

[System Configuration and Others]

Each constituent of each the illustrated devices is functionally conceptual and is not necessarily physically configured as illustrated. That is, a specific form of distribution and integration of devices is not limited to the illustrated form. All or some of the constituents may be functionally or physically distributed and integrated in any unit according to various loads, use situations, and the like. Furthermore, all or some of the processing functions executed in each device can be implemented by a CPU and a program analyzed and executed by the CPU, or can be implemented as hardware by wired logic.

Of the processes described in the present embodiment, all or some of the processes described as being executed automatically can be executed manually, or all or some of the processes described as being executed manually can be executed automatically by a known method. In addition to the above, the processing procedures, the control procedures, the specific names, and the information including various kinds of data and parameters that are illustrated in the above literatures and drawings can be changed as appropriate, unless otherwise specified.

[Program]

Figure 18:
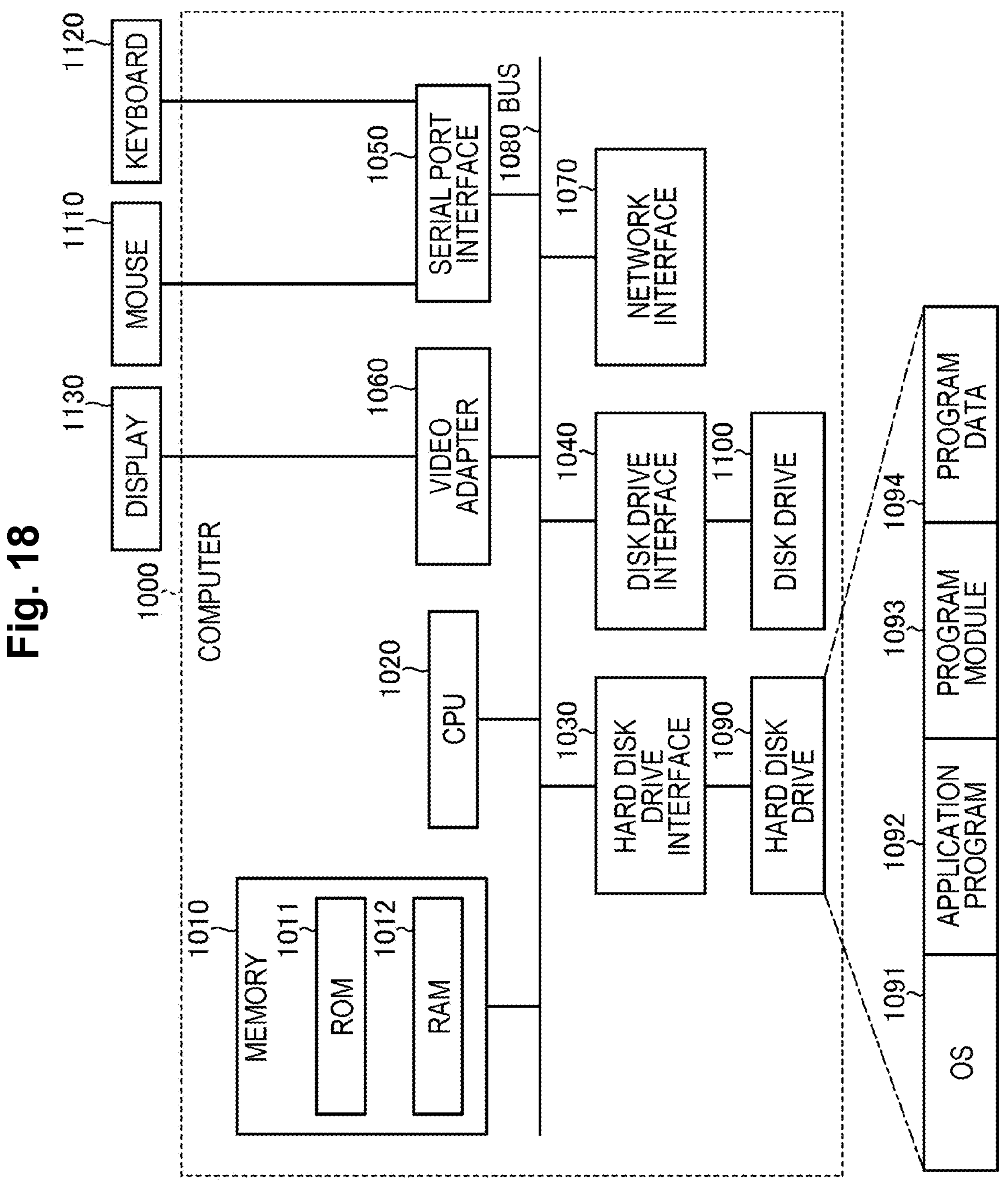
FIG. 18 is a diagram illustrating an example of a computer in which an edge device, a server device, and a setting device are implemented by executing a program.

FIG. 18 is a diagram illustrating an example of a computer in which the edge devices 20, 20B, 220, 220A, and 320 and the server devices 30, 30A, 30B, 230A, and 330 are realized by executing a program. A computer 1000 includes, for example, a memory 1010 and a CPU 1020. The above-described accelerator described above may be provided to assist computation. The computer 1000 includes a hard disk drive interface 1030, a disk drive interface 1040, a serial port interface 1050, a video adapter 1060, and a network interface 1070. These units are connected by a bus 1080.

The memory 1010 includes a read only memory (ROM) 1011 and a RAM 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disk is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an operating system (OS) 1091, an application program 1092, a program module 1093, and program data 1094. That is, the program that defines each processing of the edge devices 20, 20B, 220, 220A, and 320 and the server devices 30, 30A, 30B, 230A, and 330 is implemented as a program module 1093 in which a code that can be executed by a computer is described. The program module 1093 is stored in, for example, the hard disk drive 1090. For example, the program module 1093 for executing processes similar to the functional configurations of the edge devices 20, 20B, 220, 220A, and 320 and the server devices 30, 30A, 30B, 230A, and 330 is stored in the hard disk drive 1090. Note that the hard disk drive 1090 may be replaced with a solid state drive (SSD).

Setting data used in the processing of the above embodiment is stored in, for example, the memory 1010 or the hard disk drive 1090 as the program data 1094. The CPU 1020 reads the program module 1093 and the program data 1094 stored in the memory 1010 and the hard disk drive 1090 to the RAM 1012 as necessary and executes the program module 1093 and the program data 1094.

Note that the program module 1093 and the program data 1094 are not limited to being stored in the hard disk drive 1090, and may be stored in, for example, a detachable storage medium and read by the CPU 1020 via the disk drive 1100 or the like. Alternatively, the program module 1093 and the program data 1094 may be stored in another computer connected via a network (local area network (LAN), wide area network (WAN), or the like). The program module 1093 and the program data 1094 may be read by the CPU 1020 from another computer via the network interface 1070.

Although the embodiment to which the invention by the present inventor is applied has been described above, the present invention is not limited by the description and drawings which are part of the disclosure of the present invention according to the present embodiment. In other words, other embodiments, examples, operation technologies, and the like made by those skilled in the art and the like based on the present embodiment are all included in the scope of the present invention.

REFERENCE SIGNS LIST

20, 20B, 220, 220A, 320 Edge device
21 Quantization unit
22 Subtraction unit
23B Reception unit
24B, 31, 31A, 31B, 224, 224A, 231A, 324, 331 Inference unit
30, 30A, 30B, 230A, 330 Server device
32, 32B Determination unit
33 Integration unit
100, 100A, 100B, 200, 200A, 300 Processing system
225, 325 Edge-side determination unit

The invention claimed is:

1. A method for performing inference processing in an edge device and a server device, the method comprising:
transmitting, by the edge device, first data based on data to be inferred to a server device that performs first inference; and
transmitting, by the edge device second data based on the data to be inferred to the server device that performs second inference in response to a request from the server device, wherein
the request from the server device is made when a result of the first inference made in the server device is equal to or less than predetermined confidence, and the second data is distinct from the first data, wherein
the server device performs the second inference together with the first inference,
the second data does not include a region common to the first data, and
the first data and the second data are used simultaneously to express the data to be inferred,
the first data and the second data are transmitted to the server device after compression, and
the second data is compressed at a lower compression rate than the first data, and then a region common to the first data is subtracted.

2. The method according to claim 1, further comprising:
performing, by the server device, the first inference based on the first data;
integrating, by the server device, the first data and the second data in a case of receiving the second data; and
performing, by the server device, the second inference based on the data integrated in the process of integrating.

3. The method according to claim 1, further comprising:
performing, by the edge device, second inference using the data to be inferred.

4. The method according to claim 1, further comprising:
performing, by the edge device, third inference on the data to be inferred, wherein,
the transmitting first data further comprises transmitting the first data to the server device in a case where a result of the third inference is equal to or less than predetermined confidence.

5. The method according to claim 1, further comprising:
extracting, by the edge device, a feature amount of data to be inferred and performing fourth inference on the data to be inferred based on the extracted feature amount, wherein,
the transmitting first data further comprises transmitting the first data based on the feature amount to the server device in a case where a result of the fourth inference is equal to or less than predetermined confidence, and
the transmitting second data further comprises transmitting the second data based on the feature amount to the server device that performs the second inference in response to a request from the server device.

6. The method according to claim 1, further comprising:
performing, by the edge device, third inference on the data to be inferred, wherein,
in the first transmission process, the edge device transmits the first data to the server device in a case where a result of the third inference is equal to or less than predetermined confidence.

7. The method according to claim 1, further comprising:
extracting, by the edge device, a feature amount of data to be inferred and performing fourth inference on the data to be inferred based on the extracted feature amount, wherein,
the transmitting first data further comprises transmitting the first data based on the feature amount to the server device in a case where a result of the fourth inference is equal to or less than predetermined confidence, and
the transmitting second data further comprises transmitting the second data based on the feature amount to the server device that performs the second inference in response to a request from the server device.

8. A system for performing inference processing in an edge device and a server device connected over a network,
the server device comprising a processor configured to execute operations comprising:
performing upon receiving first data based on data to be inferred from the edge device, first inference based on the first data using a first model; and
transmitting, in a case where a result of the first inference is equal to or less than predetermined confidence, a request data to the edge device to transmit second data based on the data to be inferred, and
performing, upon receiving the second data, second inference based on the second data using a second model, wherein
the server device performs the second inference together with the first inference,
the second data does not include a region common to the first data, and
the first data and the second data are used simultaneously to express the data to be inferred,
the first data and the second data include a compressed piece of the data, and
the second data is compressed at a lower compression rate than the first data, and then a region common to the first data is subtracted.

9. The system of claim 8, the processor of the server device further configured to execute operations comprising:
performing, by the server device, the first inference based on the first data;
integrating, by the server device, the first data and the second data in a case of receiving the second data; and
performing, by the server device, the second inference based on the data integrated in the process of integrating.

10. The system of claim 8, wherein the edge device performs second inference using the data to be inferred.

11. A computer-readable non-transitory recording medium storing a computer-executable program instructions that when executed by a processor cause a computer system to execute operations comprising:
transmitting, first data based on data to be inferred to a server device that performs first inference; and
transmitting, second data based on the data to be inferred to the server device that performs second inference in response to a request from the server device, wherein
the request from the server device is made in a case where a result of the first inference made in the server device is equal to or less than predetermined confidence, and the second data is distinct from the first data, wherein
the server device performs the second inference together with the first inference,
the second data does not include a region common to the first data, and
the first data and the second data are used simultaneously to express the data to be inferred,
the first data and the second data are transmitted to the server device after compression, and
the second data is compressed at a lower compression rate than the first data, and then a region common to the first data is subtracted.

* * * * *